United States Patent
He et al.

(10) Patent No.: US 8,443,589 B2
(45) Date of Patent: May 21, 2013

(54) DIESEL OXIDATION CATALYST EFFICIENCY DIAGNOSTIC METHOD

(75) Inventors: Chuan He, Northville, MI (US); Richard B. Jess, Haslett, MI (US); Jay Tolsma, Grand Ledge, MI (US); John F. Van Gilder, Webberville, MI (US); Wenbo Wang, Novi, MI (US)

(73) Assignee: GM Global Technology Operations LLC

( * ) Notice: Subject to any disclaimer, the term of this patent is extended or adjusted under 35 U.S.C. 154(b) by 1749 days.

(21) Appl. No.: 11/098,185

(22) Filed: Apr. 4, 2005

(65) Prior Publication Data

US 2005/0279156 A1 Dec. 22, 2005

Related U.S. Application Data

(60) Provisional application No. 60/581,212, filed on Jun. 18, 2004.

(51) Int. Cl.
 *F01N 3/00* (2006.01)

(52) U.S. Cl.
 USPC .......... 60/286; 60/274; 60/277; 60/285; 60/299; 73/23.26; 73/23.31; 73/116.04

(58) Field of Classification Search
 USPC .......... 60/274, 277, 285, 286, 297; 73/23.25, 73/23.26, 23.31, 118.1, 116.04
 See application file for complete search history.

(56) References Cited

U.S. PATENT DOCUMENTS

| | | | |
|---|---|---|---|
| 6,408,616 B1 * | 6/2002 | Mazur et al. | 60/277 |
| 6,487,852 B1 * | 12/2002 | Murphy et al. | 60/286 |
| 6,499,291 B2 * | 12/2002 | Lang et al. | 60/277 |
| 6,761,023 B1 * | 7/2004 | Schnaibel et al. | 60/277 |
| 6,990,854 B2 * | 1/2006 | van Nieuwstadt et al. | 73/118.1 |
| 7,007,457 B2 * | 3/2006 | Ellmer | 60/274 |
| 7,048,891 B2 * | 5/2006 | Kinugawa et al. | 422/94 |
| 7,082,752 B2 * | 8/2006 | Plote et al. | 60/277 |
| 7,121,085 B2 * | 10/2006 | van Nieuwstadt | 60/286 |
| 7,159,384 B2 * | 1/2007 | Otake et al. | 60/277 |

FOREIGN PATENT DOCUMENTS

| | | |
|---|---|---|
| DE | 19852240 A1 | 5/2000 |
| DE | 19963932 A1 | 7/2001 |
| EP | 0609527 A1 | 8/1994 |
| WO | WO 02075128 A1 * | 9/2002 |

OTHER PUBLICATIONS

German Office Action for corresponding German patent application No. 10 2005 027 686.5-52 dated Sep. 21, 2009; 4 pages.

* cited by examiner

*Primary Examiner* — Binh Q Tran

(57) ABSTRACT

A diesel oxidation catalyst (DOC) testing system includes a DOC that is located in an exhaust system of a vehicle. A control module verifies proper operation of the DOC during a post-fuel injection process in an engine of the vehicle. The control module computes a predicted temperature of exhaust gases at an output of the DOC that corresponds with proper operation of the DOC during the post-fuel injection process, determines an actual temperature of the exhaust gases during the post-fuel injection process, and activates an alarm indicator when a difference between the predicted temperature and the actual temperature is greater than a first predetermined value. A first temperature sensor is located downstream from the DOC in the exhaust system. The first temperature sensor communicates with the control module, generates the actual temperature, and transmits the actual temperature to the control module.

28 Claims, 3 Drawing Sheets

US 8,443,589 B2

DIESEL OXIDATION CATALYST EFFICIENCY DIAGNOSTIC METHOD

CROSS-REFERENCE TO RELATED APPLICATIONS

This application claims the benefit of U.S. Provisional Application No. 60/581,212, filed on Jun. 18, 2004, which is hereby incorporated by reference in its entirety.

FIELD OF THE INVENTION

The present invention relates to vehicle emissions systems, and more particularly to vehicle emissions systems that include diesel oxidation catalysts.

BACKGROUND OF THE INVENTION

Diesel engines typically have a higher efficiency than gasoline engines due to the increased compression ratio of the diesel combustion process and the higher energy density of diesel fuel. Consequently, diesel engines commonly achieve better gas mileage than equivalently sized gasoline engines. Vehicle manufacturers incorporate emission control devices into the exhaust systems of diesel engines to reduce emissions.

In one conventional method, vehicle manufacturers incorporate particulate matter (PM) filters and diesel oxidation catalysts (DOCs) into diesel engine exhaust systems. A PM filter filters particulates from the exhaust stream. Eventually, the PM filter reaches a capacity and requires cleaning or regeneration. During regeneration, a control module initiates engine control modifications that increase the temperature of the exhaust gases. The increased temperature heats the DOC. When the DOC is at an appropriate temperature, added fuel is injected to further heat the exhaust to the PM filter. At an appropriate temperature, the PM filter burns off the trapped particulates in the PM filter. However, the DOC or other diesel exhaust system components may be adversely affected when the temperature of the exhaust gases departs from an allowable range.

SUMMARY OF THE INVENTION

A diesel oxidation catalyst (DOC) testing system according to the present invention includes a DOC that is located in an exhaust system of a vehicle. A control module verifies proper operation of the DOC during a post-fuel injection process in an engine of the vehicle. The control module computes a predicted temperature of exhaust gases at an output of the DOC that corresponds with proper operation of the DOC during the post-fuel injection process, determines an actual temperature of the exhaust gases during the post-fuel injection process, and activates an alarm indicator when a difference between the predicted temperature and the actual temperature is greater than a first predetermined value.

In other features, a first temperature sensor is located downstream from the DOC in the exhaust system. The first temperature sensor communicates with the control module, generates the actual temperature, and transmits the actual temperature to the control module. The post-fuel injection process is a regularly recurring process that is scheduled based on a condition of the DOC. Alternatively, a condition of the DOC does not require the post-fuel injection process and the control module intrusively initiates the post-fuel injection process in order to verify proper operation of the DOC. The control module intrusively initiates the post-fuel injection process only when at least one of an inlet air temperature of the engine, a temperature of coolant inside of the engine, and/or a speed of the vehicle is within a predetermined range.

In still other features of the invention, the control module intrusively initiates the post-fuel injection process only when a number of currently activated alarm indicators is less than a second predetermined value. The control module intrusively initiates the post-fuel injection process only when the engine has been activated a second predetermined number of times since a previous post-fuel injection process. The control module stores the difference between the predicted and actual temperatures and averages the difference with an additional difference between the predicted and actual temperatures that is obtained during a subsequent post-fuel injection process. The control module activates the alarm indicator when the average of the differences is greater than a second predetermined value.

In yet other features, the control module computes the predicted temperature of exhaust gases at the output of the DOC based on at least one of an energy of the exhaust gases at an input of the DOC, a thermal capacity of the DOC, and/or a thermal capacity of the first temperature sensor. The control module computes the predicted temperature of exhaust gases based on at least one of a speed of the vehicle, a rate that fuel is injected into the engine when the post-fuel injection process is not initiated, a rate that fuel is injected into the engine during the post-fuel injection process, and/or an inlet air temperature of the engine. The control module applies a weighting factor to the additional difference based on at least one of a speed of the vehicle, an inlet air temperature of the engine, an ambient air pressure outside of the engine, a quantity of fuel that is injected into the engine, and/or a pressure of the exhaust gases during the subsequent post-fuel injection process.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
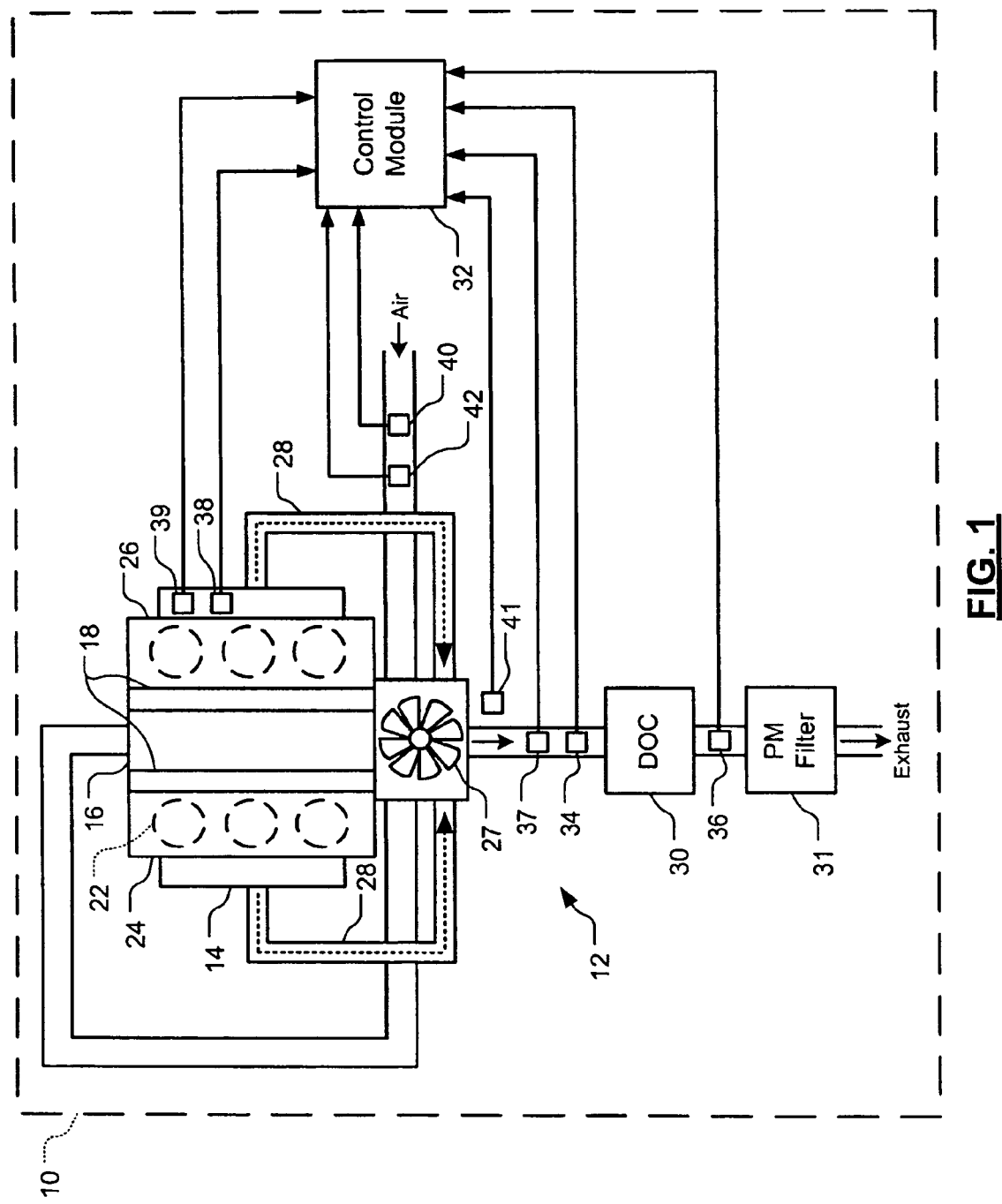
FIG. 1 is a functional block diagram of a diesel engine control system that includes a diesel oxidation catalyst (DOC) and a control module according to the present invention.

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring to FIG. 1, a vehicle 10 includes an engine control system 12 that is schematically illustrated in accordance with the present invention. The engine control system 12 includes an engine 14, an intake manifold 16, a common rail fuel injection system 18 and a turbocharger 27. The engine 14 includes six cylinders 22 configured in adjacent cylinder banks 24 and 26 and in a V-type layout. Although FIG. 1 depicts six cylinders 22, it can be appreciated that the engine 14 may include additional or fewer cylinders 22. For example, engines having 2, 4, 5, 8, 10, 12 and 16 cylinders are contemplated. It is also anticipated that the engine 14 can have an inline-type cylinder configuration.

Air is drawn into the intake manifold 16 by the inlet vacuum created by an engine turbocharger 27. Air is ducted into the individual cylinders 22 from the intake manifold 16 and is compressed therein. Fuel is injected with the air by the common rail injection system 18 and the heat of the compressed air ignites the air/fuel mixture. Exhaust gas is exhausted from the cylinders through exhaust conduits 28. The exhaust gas drives the turbocharger 27, which delivers additional air into the cylinders 22 for combustion. Those skilled in the art can appreciate that the turbocharger 27 may be omitted without departing from the scope of the present invention. Additionally, the engine 14 may include an exhaust gas recirculation (EGR) system.

The exhaust gas enters a diesel oxidation catalyst (DOC) 30, which facilitates chemical reactions with excess fuel in the exhaust gases. Exhaust gases from the DOC 30 pass through a particulate matter (PM) filter 31, which extracts PM from the exhaust stream. The exhaust gases exit the PM filter 31 and are eventually emitted from the vehicle 10. A control module 32 controls overall operation of the engine control system 12. More specifically, the control module 32 controls engine system operations based on various parameters including, but not limited to, driver input, stability control, and the like. For example, the control module 32 may be implemented in an engine control module (ECM), a vehicle computer, or may be an independent controller.

The control module 32 also performs engine system diagnostics. For example, the control module 32 according to the present invention verifies proper operation of the DOC 30. Additionally, the control module 32 initiates a post-fuel injection process to heat the exhaust gases to the PM filter 31 by oxidizing fuel in the DOC 30. The control module 32 receives a temperature signal from a first temperature sensor 34 that senses the temperature of exhaust gases at the opening of the DOC 30. The control module 32 also receives a temperature signal from a second temperature sensor 36 that senses the temperature of exhaust gases that exit the DOC 30. The control module 32 receives a pressure signal from an exhaust pressure sensor 37 that senses the air pressure in the exhaust system.

The control module 32 receives a speed signal from a speed sensor 38 in the engine 14. The control module 32 receives a temperature signal from an engine coolant sensor 39 that senses a temperature of coolant in the engine 14. The control module 32 receives a temperature signal from an inlet air temperature sensor 40 that detects an inlet air temperature of the engine 14. The control module 32 receives a pressure signal from an ambient pressure sensor 41 that senses a pressure of the air outside of the engine 14. The control module 32 receives an airflow signal from a mass airflow sensor 42 that detects a rate that air flows into the vehicle 14.

Figure 2:
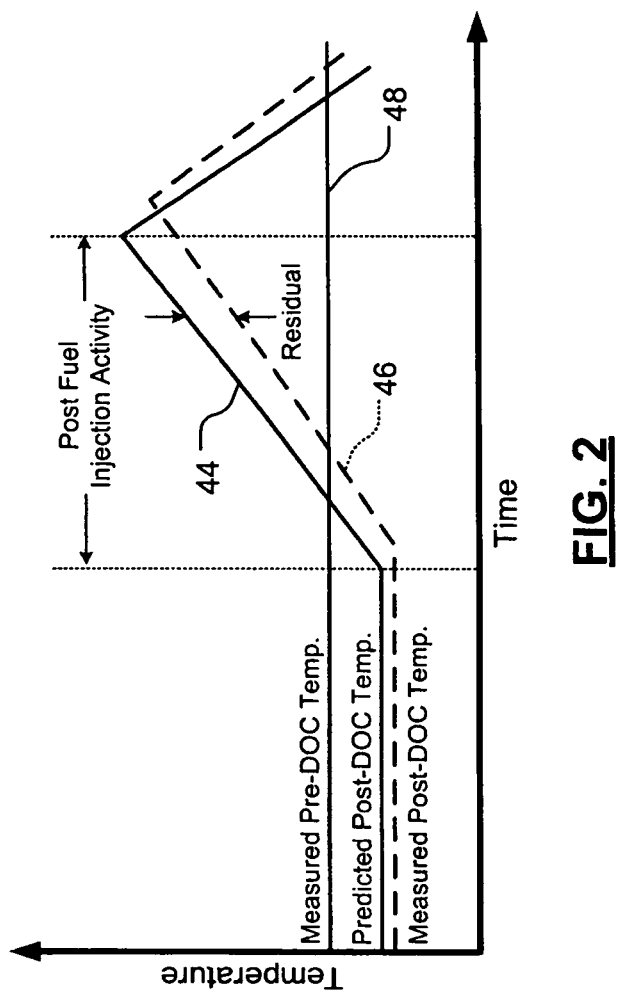
FIG. 2 is a graph illustrating exemplary measured and predicted temperature values from both upstream and downstream of a DOC during a post-fuel injection process.

Referring now to FIG. 2, the control module 32 utilizes a DOC efficiency algorithm to verify proper operation of the DOC 30. During regeneration and while a post-fuel injection activity occurs, the control module 32 determines a predicted temperature (indicated by 44 in FIG. 2) for the exhaust gases that exit the DOC 30. The predicted temperature corresponds with proper operation of the DOC 30. The control module 32 determines the predicted temperature according to one or more temperature estimation algorithms, which are well-known to those skilled in the art. For example, the control module 32 may compute the predicted temperature based on the speed of the engine 14, the primary fuel rate, the primary injection timing, boost, the post fuel rate, and EGR parameters.

The result is optionally offset and multiplied by an inlet air condition factor and/or a vehicle condition factor. The control module 32 compares the predicted temperature to the value of the temperature signal (indicated by 46 in FIG. 2) from the second temperature sensor 36 at the exit of the DOC 30. The difference between the predicted and actual values is accumulated, weighted, and averaged during a predetermined time period. For example, the predetermined time period may be during and after the post-fuel injection activity, although other time periods may be used.

In an exemplary embodiment, the offset is a temperature offset. Alternatively, the offset includes a learned function based on the post-DOC temperature. The inlet air condition factor is based on the value of the temperature signal from the inlet air temperature sensor 40 and is optionally simplified to an offset as opposed to a vector. The vehicle condition factor is a function of engine speed or based on the architecture of the exhaust system.

In an exemplary embodiment, the control module utilizes an energy balance function to compute the predicted post-DOC temperature. The energy balance function compensates for the exhaust energy that is input to the DOC 30, the heat generated by the chemical reaction of the post-injected fuel in the DOC 30, the thermal capacity of the DOC 30, and the thermal capacity of the first and second temperature sensors 34 and 36, respectively. The thermal capacity includes both the heat capacity and the heat transfer characteristics of the devices. For example, the control module 32 may first determine the pre-DOC temperature. In this case, the control module 32 then computes the predicted post-DOC temperature based on the pre-DOC temperature and the chemical reaction characteristics of the DOC 30.

The control module 32 may implement both passive and intrusive condition tests. The control module 32 initiates the passive condition test while active regeneration of the PM filter occurs. The control module 32 initiates the intrusive test by commanding post fuel injection activity during a drive cycle. The control module 32 schedules the intrusive condition test to minimize adverse impact on the customer, the durability of the engine 14, emissions performance, and fuel economy.

The control module 32 may also only run the test when predetermined engine and environmental conditions are present. For example, the control module 32 only runs the test when inlet air temperature, engine coolant temperature, and/or engine speed are within predetermined ranges. Additionally, the control module 32 only runs the test when specific system failures have not occurred or based on the PM filter 31 regeneration history. For example, the control module 32 preferably only runs the test when the last regeneration has not occurred within a predetermined number of cycles.

Figure 3:
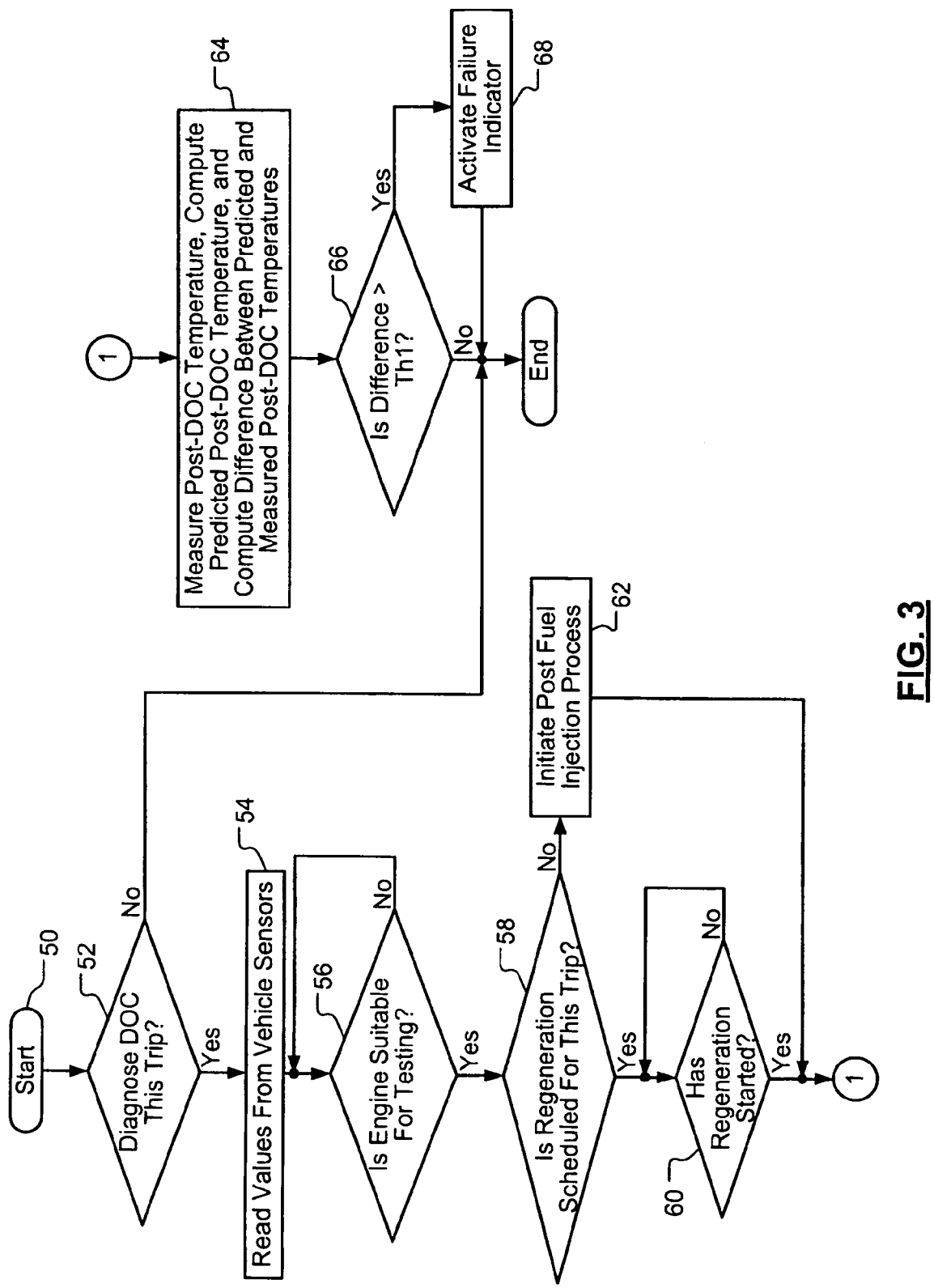
FIG. 3 is a flowchart illustrating steps performed by the control module of FIG. 1 to verify proper operation of the DOC.

Referring now to FIG. 3, an exemplary DOC efficiency algorithm begins in step 50. In step 52, control determines whether the control module 32 will diagnose the DOC 30 during the current trip. If false, control ends. If true, control proceeds to step 54. In step 54, control reads values from associated vehicle sensors. In step 56, control determines whether the engine 14 is currently suited for DOC efficiency testing. If false, control loops to step 56. If true, control proceeds to step 58. In step 58, control determines whether a regeneration post-fuel injection process is scheduled for the current trip. If true, control proceeds to step 60. If false, control proceeds to step 62. In step 60, control determines whether regeneration has started. If false, control loops to step 60. If true, control proceeds to step 64. In step 62, the control module 32 initiates a post fuel injection process and control proceeds to step 64.

In step 64, the control module 32 measures the post-DOC temperature and computes the difference between the predicted post-DOC temperature and the measured post-DOC temperature. In step 66, control determines whether the difference between the predicted post-DOC temperature and measured post-DOC temperature is greater than a first predetermined temperature. If false, control ends. If true, control proceeds to step 68. In step 68, control activates a DOC efficiency test failure indicator. For example, the DOC efficiency test failure indicator may activate a visible indicator on an instrument cluster of the vehicle 10 and/or change an operating condition in the control module 32.

The DOC efficiency algorithm of the present invention is a robust but also actively performing diagnostic that ensures proper operation of the DOC 30. The algorithm may utilize existing exhaust system architectures for vehicles that already include pre and post-DOC temperature sensors. The algorithm may also be used with exhaust systems that include multiple DOCs. The algorithm compensates for dynamic engine and ambient conditions and satisfies both run-at-rate and DOC efficiency diagnostic requirements.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A diesel oxidation catalyst (DOC) testing system, comprising:
   a DOC that is located in an exhaust system of a vehicle; and
   a control module that verifies proper operation of said DOC during a post-fuel injection process in an engine of said vehicle,
   wherein said control module computes a predicted temperature of exhaust gases at an output of said DOC that corresponds with proper operation of said DOC during said post-fuel injection process, determines an actual temperature of said exhaust gases during said post-fuel injection process, and activates an alarm indicator when said actual temperature exceeds said predicted temperature by a first predetermined value.

2. The DOC testing system of claim 1 further comprising a first temperature sensor that is located downstream from said DOC in said exhaust system, wherein said first temperature sensor communicates with said control module, generates said actual temperature, and transmits said actual temperature to said control module.

3. The DOC testing system of claim 1 wherein said post-fuel injection process is a regularly recurring process that is scheduled based on a condition of said DOC.

4. The DOC testing system of claim 1 wherein a condition of said DOC does not require said post-fuel injection process and said control module intrusively initiates said post-fuel injection process in order to verify proper operation of said DOC.

5. The DOC testing system of claim 4 wherein said control module intrusively initiates said post-fuel injection process only when at least one of an inlet air temperature of said engine, a temperature of coolant inside of said engine, and a speed of said vehicle is within a predetermined range.

6. The DOC testing system of claim 4 wherein said control module intrusively initiates said post-fuel injection process only when a number of currently activated alarm indicators is less than a second predetermined value.

7. The DOC testing system of claim 4 wherein said control module intrusively initiates said post-fuel injection process only when said engine has been activated a second predetermined number of times since a previous post-fuel injection process.

8. The DOC testing system of claim 1 wherein said control module stores a difference between said predicted and actual temperatures and averages said difference with an additional difference between said predicted and actual temperatures that is obtained during a subsequent post-fuel injection process and wherein said control module activates said alarm indicator when said average of said differences is greater than a second predetermined value.

9. The DOC testing system of claim 2 wherein said control module computes said predicted temperature of exhaust gases at said output of said DOC based on at least one of an energy of said exhaust gases at an input of said DOC, a thermal capacity of said DOC, and a thermal capacity of said first temperature sensor.

10. The DOC testing system of claim 1 wherein said control module computes said predicted temperature of exhaust gases based on at least one of a speed of said vehicle, a rate that fuel is injected into said engine when said post-fuel injection process is not initiated, a rate that fuel is injected into said engine during said post-fuel injection process, and an inlet air temperature of said engine.

11. The DOC testing system of claim 8 wherein said control module applies a weighting factor to said additional difference based on at least one of a speed of said vehicle, an inlet air temperature of said engine, an ambient air pressure outside of said engine, a quantity of fuel that is injected into said engine, and a pressure of said exhaust gases during said subsequent post-fuel injection process.

12. A diesel oxidation catalyst (DOC) testing system for a vehicle, comprising:
   a DOC that is located in an exhaust system of the vehicle;
   a first temperature sensor that is located downstream from said DOC in said exhaust system and that generates a post-DOC temperature of exhaust gases at an output of said DOC; and
   a control module that communicates with said first temperature sensor, that receives said post-DOC temperature, and that verifies proper operation of said DOC during a post-fuel injection process in an engine of said vehicle,
   wherein said control module computes a predicted temperature of exhaust gases at said output of said DOC that corresponds with proper operation of said DOC during said post-fuel injection process based on at least one of an energy of said exhaust gases at an input of said DOC, a thermal capacity of said DOC, and a thermal capacity of said first temperature sensor and wherein said control module activates an alarm indicator when a difference between said predicted temperature and said post-DOC temperature is greater than a first predetermined value.

13. A method for testing a diesel oxidation catalyst (DOC) in an exhaust system of a vehicle, comprising:
computing a predicted temperature of exhaust gases at an output of the DOC that corresponds with proper operation of the DOC during a post-fuel injection process via an energy balance function;
determining an actual temperature of said exhaust gases during said post-fuel injection process;
computing a difference between said predicted temperature and said actual temperature; and
activating an alarm indicator when said difference is greater than a first predetermined value.

14. The method of claim 13 wherein a first temperature sensor that is located downstream from the DOC in the exhaust system generates said actual temperature of said exhaust gases.

15. The method of claim 13 wherein said post-fuel injection process is a regularly recurring process that is scheduled based on a condition of the DOC.

16. The method of claim 13 further comprising intrusively initiating said post-fuel injection process in order to verify proper operation of the DOC when a condition of the DOC does not require said post-fuel injection process.

17. The method of claim 16 further comprising intrusively initiating said post-fuel injection process only when at least one of an inlet air temperature of an engine of the vehicle, a temperature of coolant inside of said engine, and a speed of the vehicle is within a predetermined range.

18. The method of claim 16 further comprising intrusively initiating said post-fuel injection process only when a number of currently activated alarm indicators is less than a second predetermined value.

19. The method of claim 16 further comprising intrusively initiating said post-fuel injection process only when an engine of the vehicle has been activated a second predetermined number of times since a previous post-fuel injection process.

20. The method of claim 13 further comprising:
storing said difference between said predicted and actual temperatures;
computing an additional difference between said predicted and actual temperatures during a subsequent post-fuel injection process;
averaging said differences; and
activating said alarm indicator when said average of said differences is greater than a second predetermined value.

21. The method of claim 14 further comprising computing said predicted temperature of exhaust gases at said output of the DOC based on at least one of an energy of said exhaust gases at an input of the DOC, a thermal capacity of the DOC, and a thermal capacity of said first temperature sensor.

22. The method of claim 13 further comprising computing said predicted temperature of exhaust gases based on at least one of a speed of the vehicle, a rate that fuel is injected into an engine of the vehicle when said post-fuel injection process is not initiated, a rate that fuel is injected into said engine during said post-fuel injection process, and an inlet air temperature of the engine of the vehicle.

23. The method of claim 20 further comprising applying a weighting factor to said additional difference based on at least one of a speed of the vehicle, an inlet air temperature of an engine of the vehicle, an ambient air pressure outside of said engine, a quantity of fuel that is injected into said engine, and a pressure of said exhaust gases during said subsequent post-fuel injection process.

24. A method for testing a diesel oxidation catalyst (DOC) in an exhaust system of a vehicle, comprising:
supplying a first temperature sensor that is located downstream from the DOC in the exhaust system and that generates a post-DOC temperature of exhaust gases at an output of the DOC;
computing a predicted temperature of said exhaust gases at said output of the DOC that corresponds with proper operation of the DOC during a post-fuel injection process based on at least one of an energy of said exhaust gases at an input of the DOC, a thermal capacity of the DOC, and a thermal capacity of said first temperature sensor;
computing a difference between said predicted temperature and said post-DOC temperature; and
activating an alarm indicator when said difference is greater than a first predetermined value.

25. The method of claim 13 wherein said predicted temperature is computed based on at least one of a current engine operating condition, a current exhaust system operating condition, and a thermal capacity.

26. The DOC testing system of claim 1 wherein said control module changes an operating condition to limit operation of said DOC at temperatures above a predetermined temperature when said actual temperature exceeds said predicted temperature by said first predetermined value.

27. The DOC testing system of claim 9 wherein said control module determines at least one of energy of said exhaust gases at an input of said DOC, a thermal capacity of said DOC, and a thermal capacity of said first temperature sensor, and
wherein said control module computes said predicted temperature of exhaust gases at said output of said DOC based on at least one of said energy, said thermal capacity of said DOC, and said thermal capacity of said first temperature sensor.

28. The DOC testing system of claim 9 wherein said control module determines at least one of a speed of said vehicle, a rate that fuel is injected into said engine when said post-fuel injection process is not initiated, a rate that fuel is injected into said engine during said post-fuel injection process, and an inlet air temperature of said engine, and
wherein said control module computes said predicted temperature of exhaust gases based on at least one of said speed of said vehicle, said rate that fuel is injected into said engine when said post-fuel injection process is not initiated, said rate that fuel is injected into said engine during said post-fuel injection process, and said inlet air temperature.

* * * * *